United States Patent
Klein et al.

(10) Patent No.: US 8,965,156 B2
(45) Date of Patent: Feb. 24, 2015

(54) BEAM COMBINER

(75) Inventors: Edwin Jan Klein, Enschede (NL); Ronald Dekker, Enschede (NL); Hindrik F. Bulthuis, Apeldoorn (NL)

(73) Assignee: Octrolix BV, Enschede (NL)

( * ) Notice: Subject to any disclaimer, the term of this patent is extended or adjusted under 35 U.S.C. 154(b) by 0 days.

(21) Appl. No.: 13/208,806

(22) Filed: Aug. 12, 2011

(65) Prior Publication Data

US 2012/0039565 A1 Feb. 16, 2012

Related U.S. Application Data

(60) Provisional application No. 61/344,553, filed on Aug. 19, 2010, provisional application No. 61/376,483, filed on Aug. 24, 2010, provisional application No. 61/477,960, filed on Apr. 21, 2011.

(51) Int. Cl.
| | | |
|---|---|---|
| *G02F 1/025* | (2006.01) | |
| *G02B 6/43* | (2006.01) | |
| *G02B 6/122* | (2006.01) | |
| *G02B 6/12* | (2006.01) | |
| *G02B 6/293* | (2006.01) | |

(52) U.S. Cl.
CPC ........ *G02B 6/12007* (2013.01); *G02B 6/29332* (2013.01); *G02B 6/2938* (2013.01)
USPC ........ 385/41; 385/1; 385/14; 385/31; 385/42; 385/129

(58) Field of Classification Search
CPC .. G02B 6/2821; G02B 6/2843; G02F 1/3132; G02F 2203/07
USPC ............. 385/14, 24, 31, 37, 40–42, 126–132, 385/141, 1
See application file for complete search history.

(56) References Cited

U.S. PATENT DOCUMENTS

| | | | |
|---|---|---|---|
| 4,146,297 A | | 3/1979 | Alferness et al. |
| 5,559,913 A | * | 9/1996 | Lerminiaux .................... 385/43 |
| 6,212,310 B1 | * | 4/2001 | Waarts et al. ................... 385/24 |

(Continued)

FOREIGN PATENT DOCUMENTS

WO 03065088 A2 8/2003

OTHER PUBLICATIONS

Mangeat et al., "Integrated polarization rotator made of periodic asymmetric buried Ta2O5/silica sol-gel waveguides", "Optics Express", Sep. 17, 2007, pp. 12436-12442, vol. 15, No. 19, Publisher: Optical Society of America, Published in: US.

(Continued)

*Primary Examiner* — Kaveh Kianni
*Assistant Examiner* — Hung Lam
(74) *Attorney, Agent, or Firm* — Kaplan Breyer Schwarz & Ottesen, LLP

(57) ABSTRACT

A beam combiner is disclosed that comprises a planar lightwave circuit that is based on undoped silicon nitride-based surface waveguides, wherein the planar lightwave circuit comprises a plurality of input ports, a mixing region, and an output port, and wherein the mixing region comprises a plurality of directional couplers that are arranged in a tree structure. Embodiments of the present invention are capable of combining a plurality of light signals characterized by disparate wavelengths on irregular spacings with low loss. Further, the present invention enables high-volume, low cost production of beam combiners capable of combining three or more light signals into a single composite output beam.

13 Claims, 8 Drawing Sheets

(56) References Cited

U.S. PATENT DOCUMENTS

| | | |
|---|---|---|
| 7,978,189 B2 | 7/2011 | Sprague et al. |
| 2003/0002786 A1 | 1/2003 | Ooyama et al. |
| 2008/0004525 A1 | 1/2008 | Goldman et al. |
| 2008/0027317 A1 | 1/2008 | Wood et al. |
| 2009/0079941 A1 | 3/2009 | Miller et al. |
| 2012/0068609 A1 | 3/2012 | Ide et al. |

OTHER PUBLICATIONS

Shani et al., "Polarization rotation in asymmetric peiodic loaded rib waveguides", "Applied Physics Letters", Sep. 9, 1991, pp. 1278-1280, vol. 59, No. 11, Publisher: American Institute of Physics, Published in: US.

Davids et al., "Surface plasmon induced polarization rotation and optical vorticity in a single mode waveguide", "Optics Express", Jul. 23, 2007, pp. 9476-9485, vol. 15, No. 15, Publisher: Optical Society of America, Published in: US.

Senichi Suzuki, et al., "High-Density Integrated Planar Lightwave Circuits Using SiO2—GeO2 Waveguides with a High Refractive Index Difference", "Journal of Lightwave Technology", May 1, 1994, pp. 790-796, vol. 12, No. 5, Publisher: IEEE Service Center, New York, NY, US // ISSN: 0733-8724, DOI: 10.1109/50.293970, Published in: US.

Alexander Menck, "Related EP Application No. EP 12180268 Search Report", Dec. 21, 2012, Publisher: EPO, Published in: EP.

"Related European Patent Application No. 12 180 268.0-1553 Examination Report", Jan. 6, 2014, Publisher: EPO, Published in: EP.

\* cited by examiner

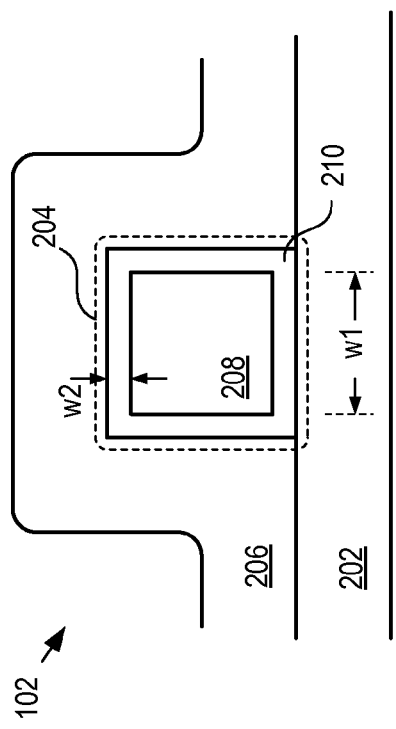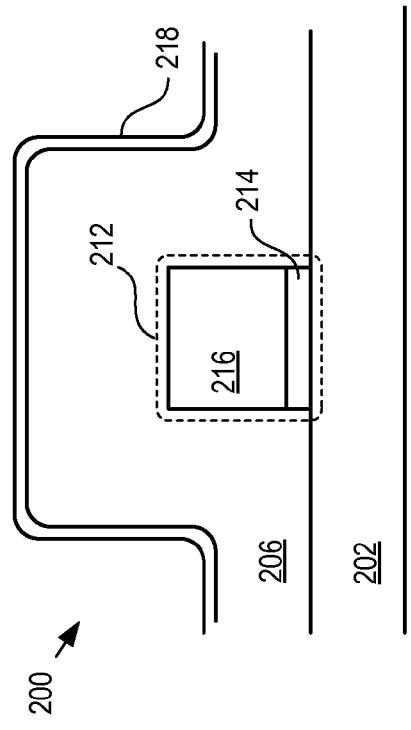
FIG. 2A
FIG. 2B

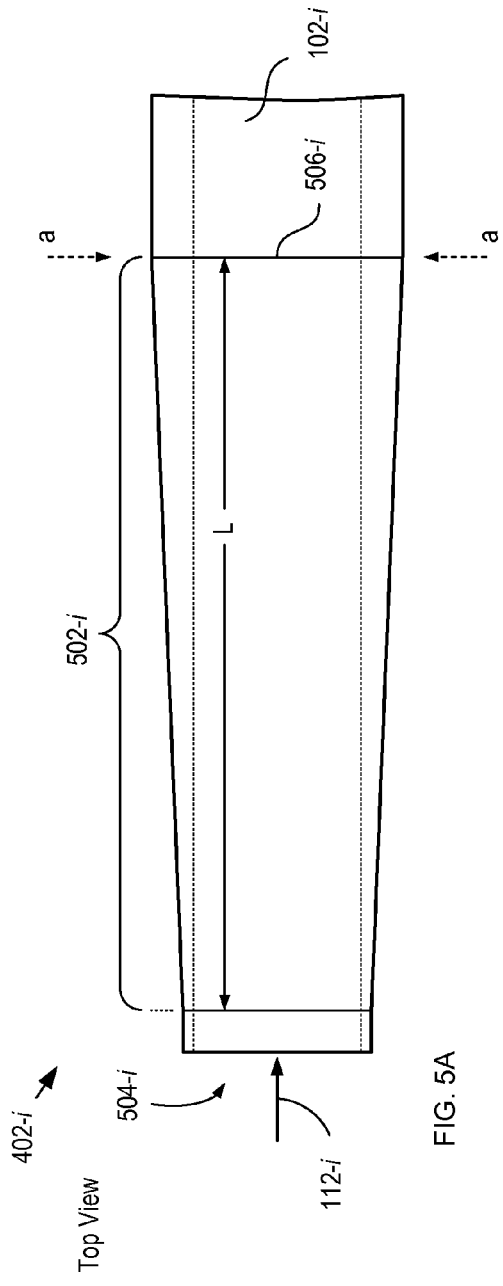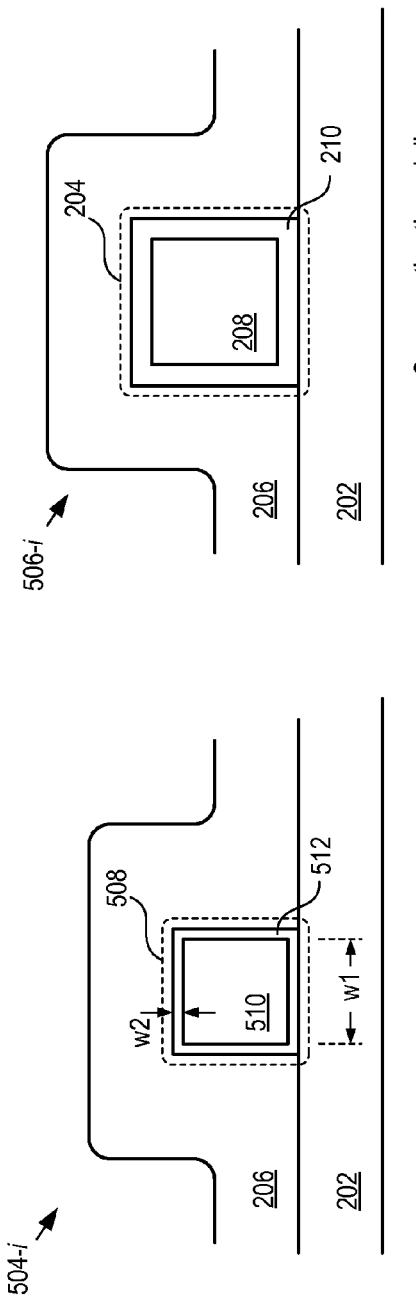

006# BEAM COMBINER

CROSS REFERENCE TO RELATED APPLICATIONS

This application claims the benefit of U.S. Provisional Application Ser. No. 61/344,553, filed Aug. 19, 2010, U.S. Provisional Application Ser. No. 61/376,483, filed Aug. 24, 2010, and U.S. Provisional Application Ser. No. 61/477,960, filed Apr. 21, 2011, each of which is incorporated by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to planar lightwave circuits in general, and, more particularly, to planar lightwave circuit-based optical beam combiners.

BACKGROUND OF THE INVENTION

An ability to combine multiple light signals, each comprising different wavelengths, into a single output light signal is needed in many applications, such as quality control of produce such as fruits and vegetables, confocal microscopy, medical diagnosis, disease treatment, and waste sorting in recycling and waste management.

In an effort to satisfy this need, prior-art beam combiners based on several different technologies have been developed. These include free-space beam combiners, fiber-based beam combiners, and surface waveguide combiners based on either array-waveguide gratings or lithium niobate waveguides. Unfortunately, each of these approaches has significant drawbacks that have thus far limited their use in many applications.

Free-space beam combiners employ bulk optics elements such as mirrors, dichroic elements, filters, and lenses to bring light signals arriving on different optical paths into a single output optical path. As a result, they are bulky and expensive. In addition, the alignment of the multiple bulk elements is typically thermally sensitive and also very labor intensive. High-volume production of such systems, therefore, is difficult to do at reasonable cost and speed. Still further, the difficulty of aligning the optical components becomes increasingly difficult with each added light signal to be combined.

Optical fiber-based beam combiners employ multiple input optical fibers that are heated and then fused together to bring their cores into proper alignment with one another. The fabrication of these fusion-spliced combiners can be extremely difficult, particularly when three or more input optical fibers are desired. The difficulty arises from the way in which such combiners are made. Initially, two fibers are fused to put their cores into a close physical relationship. Once this fusion step is complete, a third fiber is added to the output portion of the first fusion splice by repeating the fusion process for the output portion and a third fiber. Unfortunately, it is extremely difficult to add the third fiber to the fusion splice without degrading the quality of overall system, since it is necessary that the complete fusion-spliced beam combiner work for all wavelengths simultaneously. In addition, for many applications, it is necessary to preserve polarization properties in the system, which is exceedingly difficult to enable with a fusion-spliced optical fiber-based beam combiner. These difficulties are exacerbated by the fact that it is typically desirable to keep the overall size of the fusion-splice region small. Further, the process becomes increasingly difficult as more and more fibers are added to the fiber-based beam combiner. As a result, high-volume production of fiber-based beam combiners is difficult. In addition, while smaller than free-space beam combiners, fiber-based combiners also tend to be too large and bulky for many desired applications.

Surface waveguide-based beam combiners have been demonstrated based on either silica-based waveguide systems comprising array waveguide gratings (AWGs) or lithium niobate waveguide-based systems. An AWG can combine many light signals that are closely spaced in wavelength and that have substantially regular wavelength spacing. They are ill suited for combining light signals having disparate wavelengths (i.e., widely spaced and irregularly spaced in wavelength), however. In addition, higher-order diffraction modes that propagate through an AWG limit the span of wavelengths for which the AWG can be used. Further, since silica waveguides require doping to define the waveguiding elements, their utility at shorter wavelengths (e.g., <600 nm) is limited. Further, silica waveguides do not tightly confine the optical mode of propagating light signals; therefore, silica-based optical-circuit elements must be large, which results in very large silica-based planar lightwave circuits.

Directional couplers to multiplex multiple light signals at telecommunications wavelengths (i.e., 1300-1600 nm) have been demonstrated in lithium niobate technology. For example, as described by R. C. Alferness in U.S. Pat. No. 4,146,297, issued Mar. 27, 1979, an asymmetric waveguide directional coupler comprising titanium-based waveguides formed in a lithium niobate substrate can be used to enable a single wavelength of light to cross over from one waveguide into the other, wherein the cross-over wavelength is determined by the relative effective refractive indices of the two waveguides. The effective refractive indices of the waveguides are controlled via an applied electric field to "tune" the cross-over wavelength to overcome variations in fabrication. Alferness further discloses a series arrangement of such directional couplers that enables the addition of one or more light signals to a bus waveguide one at a time.

Unfortunately, lithium niobate waveguides are characterized by an operable wavelength range that is relatively narrow. This is due to the reliance of dopants to form lithium niobate waveguides, which can limit their use for applications requiring shorter wavelengths. In addition, in many applications, a high extinction ratio between the TE and TM polarization modes in propagating light is desirable. It is extremely difficult to develop strong polarization dependence in lithium niobate waveguides, however. Finally, lithium niobate is notoriously expensive and difficult to fabricate relative to other waveguide technologies.

SUMMARY OF THE INVENTION

The present invention enables a beam combiner that overcomes some of the costs and disadvantages of the prior art. Embodiments of the present invention are suitable for high-volume production and enable the combination of multiple wavelengths in a device having a small footprint. Embodiments of the present invention are well suited for use in applications that include medical diagnostics, medical treatment modalities, environmental monitoring, food inspection, two-dimensional beam projection, three-dimensional beam projection, and optical sorting of recycled material and other waste.

The present invention provides a platform for combining a plurality of input light signals having disparate wavelengths into a single output light signal. An illustrative embodiment is a planar lightwave circuit comprising a plurality of single-mode surface waveguides that are arranged to collectively define a plurality of input ports, a mixing region, and an output port, wherein the mixing region includes a plurality of directional couplers that are arranged in a tree structure. This planar lightwave circuit is based on single-mode surface waveguides having a core comprising stoichiometric silicon nitride and cladding of undoped silicon dioxide. The use of undoped dielectric materials for the core and cladding layers enables such surface waveguides to enable low-loss propagation of light signals that span an extremely wide range of wavelengths, including wavelengths shorter than 400 nanometers (nm).

Directional couplers included in the mixing region are designed to receive one or more first light signals from a first waveguide and one or more second light signals from a second waveguide and combine all of the first and second light signals into a composite optical signal that is provided on the second waveguide. The directional couplers are designed to enable substantially all of the optical energy of the first light signals in the first waveguide to transfer into the second waveguide, while substantially all of the optical energy of the second light signals remains in the second waveguide.

In the mixing region, directional couplers are arranged in a first arrangement comprising a tree structure. As a result, simply by adding branches or stages to the mixing region, the input port count of the beam combiner, and therefore, the number of light signals that can be combined, can be easily increased. This is in marked contrast to prior-art beam combiners, such as fusion-spliced optical fiber-based beam combiners, wherein increasing the number of input ports beyond two or three becomes increasingly difficult.

In some embodiments, at least one input port has a mode-matching region that enables low-loss optical coupling of a light source to the beam combiner. The mode-matching region includes a waveguide region that is tapered from an end facet to an interface so that the effective refractive-index contrast at the end facet is lower or higher than the effective refractive-index contrast at the interface. At the interface, the optical mode is mode-matched to the waveguide structure that forms the bulk of the planar lightwave circuit to substantially avoid an abrupt impedance mismatch that would result in optical attenuation.

In some embodiments, the beam combiner comprises waveguide-based attenuators for controlling the amount of light from one or more of the light sources that is combined in the mixing region.

An embodiment of the present invention comprises an apparatus comprising a beam combiner that includes a planar lightwave circuit comprising: a plurality of input ports; a mixing region, the mixing region comprising a plurality of directional couplers that are arranged in a first arrangement comprising a tree structure; and a first output port that is optically coupled with the plurality of input ports via the mixing region.

BRIEF DESCRIPTION OF THE DRAWINGS

FIG. 2A depicts a schematic drawing of a cross-sectional view of a waveguide structure in accordance with the illustrative embodiment of the present invention.

FIG. 2B depicts a schematic drawing of a cross-sectional view of a waveguide in accordance with an alternative embodiment of the present invention.

FIG. 5A depicts a schematic drawing of a top view of a mode-matching region in accordance with the first alternative embodiment of the present invention.

FIG. 5B depicts a schematic drawing of a cross-sectional view of the end facet of a mode-matching region in accordance with the first alternative embodiment of the present invention.

FIG. 5C depicts a schematic drawing of a cross-sectional view of the interface of a mode-matching region in accordance with the first alternative embodiment of the present invention.

DETAILED DESCRIPTION

Figure 1:
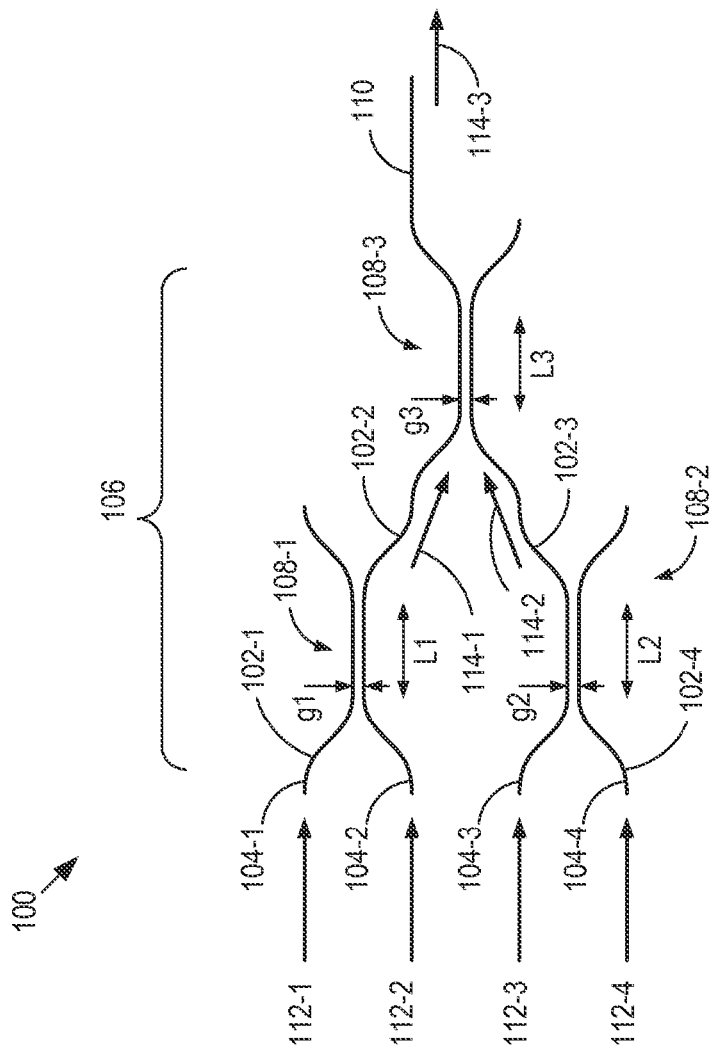
FIG. 1 depicts a schematic drawing of a portion of a beam combiner in accordance with an illustrative embodiment of the present invention.

FIG. 1 depicts a schematic drawing of a portion of a beam combiner in accordance with an illustrative embodiment of the present invention. Beam combiner 100 is a planar lightwave circuit that includes a plurality of surface waveguides 102-1 through 102-4 (referred to, collectively, as waveguides 102), which are arranged to define input ports 104-1 through 104-4, mixing region 106, and output port 110. For the purposes of this Specification, including the appended claims, a "planar lightwave circuit" is defined as an optical circuit that comprises one or more monolithically integrated waveguide structures that are arranged to provide at least one optical function.

Although in the illustrative embodiment beam combiner 100 comprises four inputs, it will be clear to one skilled in the art, after reading this Specification, how to specify, make, and use alternative embodiments of the present invention that include any practical number of inputs.

Each of waveguides 102 is a single-mode waveguides characterized by a large difference between the refractive index of its core material and cladding material (typically referred to as "a high-contrast waveguide"). As a result, each of waveguides 102 is characterized by strong optical mode confinement, can include curved sections that have small bend radii, and can include waveguides in a densely packed arrangement. Planar lightwave circuits based on waveguide 102, therefore, can provide a high degree of functionality in a much smaller footprint than conventional low-index waveguide-based planar lightwave circuits.

FIG. 2A depicts a schematic drawing of a cross-sectional view of a waveguide structure in accordance with the illustrative embodiment of the present invention. Waveguide 102 is a composite-core waveguide (referred to, herein, as a TriPleX™ waveguide), such as is described in U.S. Pat. No. 7,146,087, issued Dec. 5, 2006, which is incorporated herein by reference. Waveguide 102 comprises lower cladding 202, core 204, and upper cladding 206.

Lower cladding 202 is a layer of silicon dioxide having a thickness typically within the range of approximately 1 micron to approximately 10 microns. Lower cladding 202 can be formed by any of a number of conventional methods, including thermal growth, LPCVD deposition, spin-on coating, and the like. It will be clear to one skilled in the art how to specify, make, and use lower cladding 202.

Core 204 comprises inner core 208 and outer core 210, which completely surrounds inner core 208.

Inner core 208 comprises stoichiometric silicon dioxide. Inner core 208 has a substantially square cross-sectional shape having a size, w1, of approximately 1 micron on a side. In some embodiments, inner core 208 has a different shape and/or different dimensions.

Outer core 210 comprises stoichiometric silicon nitride having a thickness equal to w2. In the illustrative embodiment, w2 is approximately equal to 200 nm; however, it will be clear to one skilled in the art, after reading this Specification, how to specify, make, and use alternative embodiments of the present invention wherein w2 is any practical size.

In some embodiments, outer core 210 does not completely surround inner core 210. In some embodiments, outer core 210 comprises a layer of stoichiometric silicon nitride disposed on inner core 208 and/or a layer of stoichiometric silicon nitride that interposes inner core 208 and lower cladding 202.

Upper cladding 206 is a layer of silicon dioxide formed as a conformal coating over core 204. Upper cladding 206 is formed using conventional conformal deposition techniques, such as plasma-enhanced chemical vapor deposition, low-pressure chemical vapor deposition using tetraethyl orthosilicate (TEOS) as a precursor gas, and the like.

FIG. 2B depicts a schematic drawing of a cross-sectional view of a waveguide in accordance with an alternative embodiment of the present invention. Waveguide 200 is a silicon-nitride-core waveguide that comprises lower cladding 202, core 212, upper cladding 206, and barrier layer 218.

Core 212 comprises lower core 214 and upper core 216, which is disposed on lower core 214.

Lower core 214 comprises stoichiometric silicon nitride. Lower core 214 has a substantially rectangular cross-sectional shape having a width within the range of approximately 0.8 microns to approximately 3 microns and a height within the range of approximately 3 nm to approximately 30 nm. In some embodiments, lower core 214 has a different shape and/or different dimensions.

Upper core 216 comprises silicon dioxide deposited using TEOS as a precursor gas. Upper core 216 has a width substantially equal to the width of lower core 214 and a thickness within the range of approximately three to approximately twenty times the thickness of lower core 214. In some embodiments, upper core 216 enables a reduction in the internal stress of lower core 214 and/or reduces scattering in lower core 214, as well as having other positive effects that lead to a reduction in propagation loss for light propagating through waveguide 200. One skilled in the art will recognize, after reading this Specification, that the dimensions of lower core 214 and/or upper core 216 are based on several factors, including the wavelength of light that is expected to propagate through the waveguide.

Upper cladding 206 is covered with optional barrier layer 218. Barrier layer 218 comprises silicon nitride and provides a barrier to moisture and contaminants that might otherwise be absorbed by waveguide 200. In some embodiments, barrier layer 218 is not included.

It should be noted that waveguide structures in accordance with the present invention do not require dopant diffusion to achieve their guiding capability. The use of undoped materials, such as stoichiometric silicon nitride and stoichiometric silicon dioxide, enables higher power handling than waveguides that are doped to control refractive index of one or more of their core and cladding. Further, the use of undoped materials also enables low-loss propagation of light having shorter wavelengths than is possible with conventional doped waveguide structures.

Conventional silica-based waveguides and lithium niobate waveguides rely on doping regions of a substrate with impurities, such as phosphorous, boron or germanium, to provide a difference in refractive index. Unfortunately, such dopants are notoriously sensitive to near-ultraviolet light, which limits the use of such waveguides at shorter wavelengths. In addition, it is difficult to control the dopant configuration, which leads to increased cost for such waveguides.

Further, waveguides such as waveguides 102 and 200 enable the beam combiner 100 to operate over an extremely broad wavelength range, as compared to conventional waveguides. Waveguides 102 and 200 can be designed for operation for light having wavelengths within the range of approximately 400 nm to approximately 2000 nm. In some embodiments, waveguides 102 and 200 are designed for operation at even shorter wavelengths.

It is an aspect of the present invention that waveguides in accordance with the present invention enable a high-extinction ratio between the transmission loss for the TE and TM polarization modes of light propagating through beam combiner 100. As a result, the present invention exhibits better polarization control than beam combiners in the prior art. The difference in propagation loss between the polarization modes arises from several design considerations. First, waveguides in accordance with the present invention exhibit more scattering loss for one polarization mode (typically the TE mode) than the other. Second, some embodiments of the present invention are designed such that one polarization mode (typically the TM mode) optically couples with conventional optical fiber more efficiently than the other polarization mode. Third, in some embodiments, the TE mode is more tightly confined in the waveguides. As a result, this mode does not couple significantly between the waveguides of a directional coupler. Lastly, in some embodiments, directional couplers are designed to be polarization-dependent.

One skilled in the art will recognize, after reading this Specification, that the waveguide structures depicted in FIGS. 2A and 2B represent only two examples of surface waveguide structures suitable for use in beam combiner 100. It will be clear to one skilled in the art, after reading this Specification, that waveguide structures suitable for use in beam combiner 100 include, without limitation, ridge waveguides, channel waveguides, stripe waveguides, multi-layered waveguides, femto-second laser-written waveguides, graded-index waveguides, and the like.

Returning now to FIG. 1, input ports 104-1 through 104-4 (referred to, collectively, as input ports 104) receive light signals 112-1 through 112-4, respectively. In a typical beam-combiner application, the wavelengths of light signals 112-1 through 112-4 are typically separated by a wavelength spacing within the range of approximately 25 nm to approximately 70 nm over a wavelength range that can be as large as approximately 400 nm to approximately 2000 nm. Further, in a typical beam-combiner application, light signals 112-1 through 112-4 are irregularly spaced.

For example, in some beam-combiner applications, such as medical diagnostic applications, light signal 112-1 might be characterized by a wavelength that is readily absorbed by blood, such as 850 nm, light signal 112-2 might be characterized by a wavelength that is readily visible to the human eye (e.g., a wavelength within the range of approximately 520 nm to approximately 570 nm, 633 nm, 650 nm, 670 nm, 593.5 nm, 473 nm, or 405 nm), light signal 112-3 might be characterized by a wavelength that is suitable for exciting a phosphor used in vision enhancement systems (e.g., night vision goggles, etc.), and light signal 112-4 might be characterized by a wavelength suitable for exciting a biological marker comprising a fluorescent label (e.g., 488 nm).

Alternatively, in some beam-combiner applications, such as visible-light projectors, light signal 112-1 might be characterized by a wavelength in the blue region, such as approximately 445 nm, light signal 112-2 might be characterized by a wavelength in the green region, such as approximately 532 nm, and light signal 112-3 might be characterized by a wavelength in the red region, such as approximately 640 nm.

The wavelengths described herein are provided merely as examples, and it will be clear to one skilled in the art, after reading this Specification, how to specify, make, and use alternative embodiments of the present invention wherein light signals 112-1 through 112-4 are characterized by any suitable wavelengths within the operating wavelength range of waveguides 102.

It should be noted that in some embodiments, beam combiner 100 is designed for combining light signals having wavelengths that are closely and/or regularly spaced.

For exemplary purposes, light signals 112 are described herein as being provided by fiber-pigtailed laser diodes. It will be clear to one skilled in the art, after reading this Specification, however, how to specify, make, and use alternative embodiments of the present invention wherein at least one of light signals 112 is provided by a light source other than a fiber-pigtailed laser diode, such as:

i. a light signal that is directly coupled from output facet of a light source; or ii. a lens that focuses the light output by a light source onto the waveguide facet; or iii. a surface waveguide that is optically coupled with one of inputs 104.

Mixing region 106 comprises portions of waveguides 102 that have been arranged to form directional couplers 108-1 through 108-3.

Directional coupler 108-1 comprises first portions of waveguides 102-1 and 102-2 that are separated by gap g1 along interaction length L1. Directional coupler 108-1 is a symmetric coupler (i.e., the portions of waveguides 102-1 and 102-2 have substantially the same width) that is characterized by wavelength-dependent power coupling that varies slowly with wavelength. The values of g1 and L1 are carefully chosen to enable substantially all of the optical energy in light signal 104-1 to optically couple from waveguide 102-1 into waveguide 102-2 along interaction length L1, but substantially none of the optical energy in light signal 104-2 optically couples from waveguide 102-2 to waveguide 102-1. As a result, directional coupler 108-1 provides both light signals 112-1 and 112-2, combined as composite output signal 114-1, on waveguide 102-2.

Figure 3A:
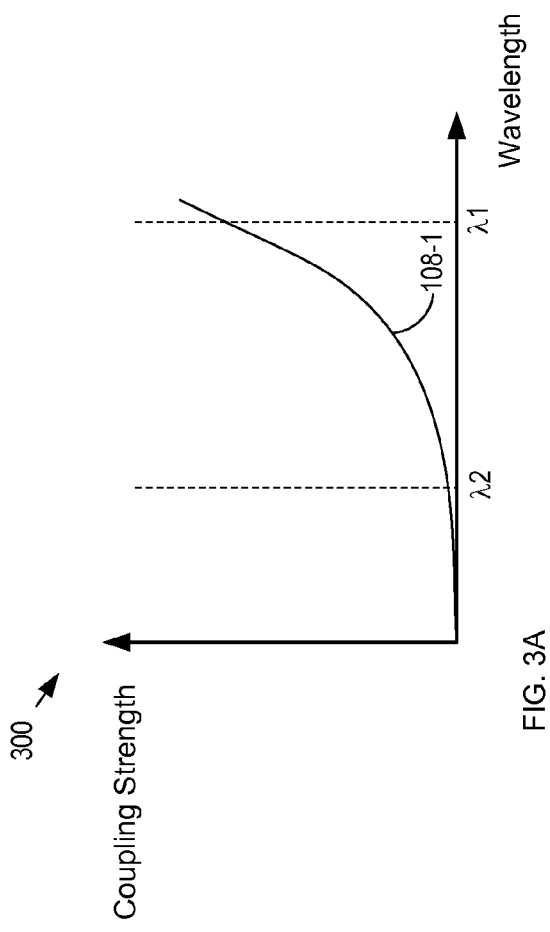
FIG. 3A depicts a plot of coupling behavior for a directional coupler design in accordance with the illustrative embodiment of the present invention.

FIG. 3A depicts a plot of coupling behavior for a directional coupler design in accordance with the illustrative embodiment of the present invention. Plot 300 depicts a plot of coupling strength versus wavelength for the design of directional coupler 108-1. Directional coupler 108-1 has relatively little coupling at shorter wavelengths but relatively strong coupling strength for longer wavelengths. Light signal 112-1 is characterized by wavelength λ1 and light signal 112-2 is characterized by wavelength λ2. In addition to wavelengths of light signals 112-1 and 112-2, the coupling strength of directional coupler 108-1 is based on its design, including the separation between waveguides 102-1 and 102-2 in coupling region 302, the cross-sections of waveguides 102-1 and 102-2 in coupling region 302, and the length, L1, of coupling region 302.

Figure 3C:
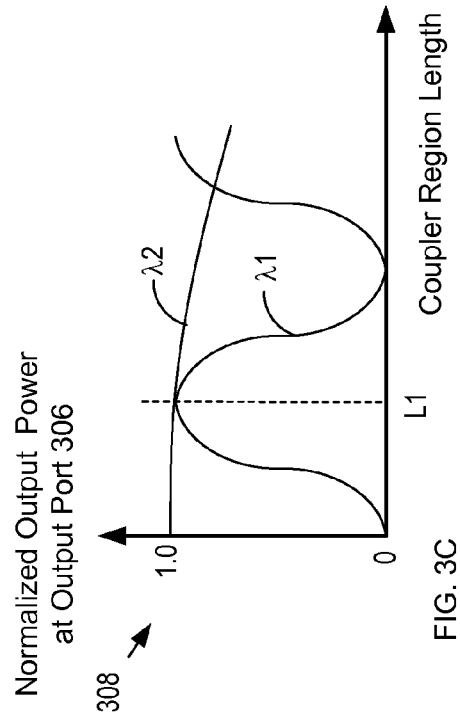
FIG. 3C depicts a plot of output power versus coupler region length for a directional coupler in accordance with the illustrative embodiment of the present invention.
Figure 3B:
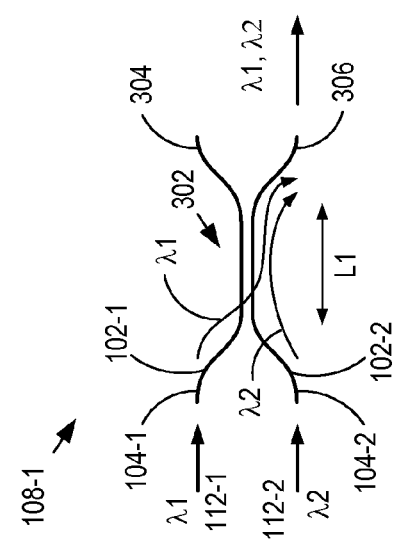
FIG. 3B depicts a schematic representation of the wavelength coupling behavior of directional coupler 108-1.

FIG. 3B depicts a schematic representation of the wavelength coupling behavior of directional coupler 108-1. Directional coupler 108-1 receives light characterized by wavelength λ1 (i.e., light signal 112-1) at input port 104-1 and light characterized by wavelength λ2 (i.e., light signal 112-2) at input port 104-2. While traversing coupling region 302, light signal 112-1 couples substantially completely into waveguide 102-2. At the same time, while traversing coupling region 302, light signal 112-2 remains substantially completely within waveguide 102-2. As a result, both light signals 112-1 and 112-2 exit the directional coupler at output port 306.

FIG. 3C depicts a plot of output power versus coupler region length for a directional coupler in accordance with the illustrative embodiment of the present invention. Plot 308 depicts the normalized output power at output port 306 versus the length of coupler region 302 for light signals characterized by wavelengths λ1 and λ2. Since directional coupler 108-1 has substantially no coupling strength for light signal 112-2, plot 308 shows little dependence on coupler region length for wavelength λ2. In contrast, directional coupler 108-1 has strong coupling for light signal 112-1; therefore, plot 308 shows a substantially sinusoidal relationship on coupler region length for the output power of for wavelength λ1. The length of coupling region 302 is chosen as a point where the output power of both wavelengths λ1 and λ2 is substantially a maximum (i.e., length L1). It should be noted that for a coupling region having length L1, wavelength λ1 couples once while wavelength λ2 never couples, which is fairly typical for signals characterized by moderate wavelength differences.

Figure 3D:
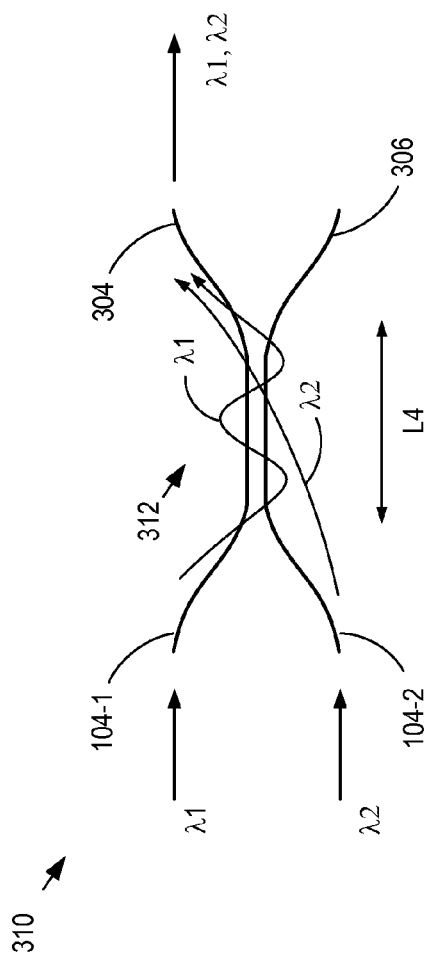
FIG. 3D depicts a schematic representation of the wavelength coupling behavior of an alternative directional coupler design suitable for light signals having relatively larger wavelength differences.

FIG. 3D depicts a schematic representation of the wavelength coupling behavior of an alternative directional coupler design suitable for light signals having relatively larger wavelength differences. Directional coupler 310 is an alternative design for directional coupler 108-1, which comprises coupler region 312. Coupler region 312 has a coupling length, L4, which enables wavelengths λ1 and λ2 to couple between waveguides 102-1 and 102-2 multiple times within the coupling region and exit directional coupler 310 as a composite output signal at output 304.

Figure 3E:
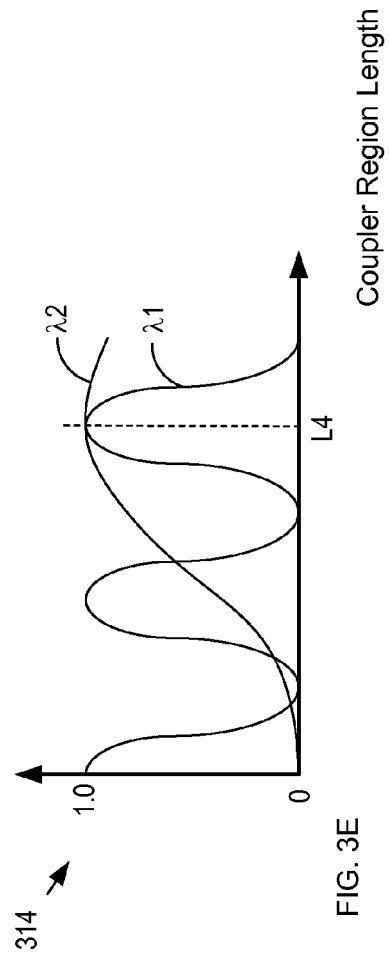
FIG. 3E depicts a plot of output power versus coupler region length for directional coupler 310.

FIG. 3E depicts a plot of output power versus coupler region length for directional coupler 310. Plot 314 depicts the normalized output power at output port 304 of coupler 310 versus the length of coupler region 312 for light signals characterized by wavelengths λ1 and λ2 (i.e., light signals 112-1 and 112-2). Directional coupler 310 enables the optical energy of light signal 112-1, to couple four times from waveguide 102-2 into waveguide 102-1 over the length of coupling region 312. In similar fashion, directional coupler 310 enables light signal 112-2 to couple one time over the length of coupling region 312. The length of coupling region 312 is chosen as a point where the output power of both wavelengths $\lambda 1$ and $\lambda 2$ is substantially a maximum (i.e., length L4).

Returning now to FIG. 1, directional coupler 108-2 comprises first portions of waveguides 102-3 and 102-4 that are separated by gap g2 along interaction length L2. Directional coupler 108-2 is also characterized by wavelength-dependent power coupling and the values of g2 and L2 are selected to enable substantially all of the optical energy in light signal 104-4 to optically couple from waveguide 102-4 into waveguide 102-3 along interaction length L2, but substantially none of the optical energy in light signal 104-3 optically couples from waveguide 102-3 into waveguide 102-4. As a result, directional coupler 108-2 provides both light signals 112-3 and 112-4, combined as composite output signal 114-2, on waveguide 102-3.

Directional couplers 108-1 through 108-3 are arranged in a tree structure such that directional coupler 108-3 receives the composite output signals 114-1 and 114-2 on second portions of waveguides 102-2 and 102-3 that are separated by gap g3 along interaction length L3. Like directional couplers 108-1 and 108-2, directional coupler 108-3 is characterized by a slowly varying wavelength-dependent power coupling. The values of g3 and L3 are chosen to enable substantially all of the optical energy in composite output signal 114-2 (i.e., each of light signals 104-3 and 104-4) to optically couple from waveguide 102-3 into waveguide 102-2 along interaction length L3, but substantially none of the optical energy in composite output signal 114-1 optically couples from waveguide 102-2 into waveguide 102-3. As a result, directional coupler 108-3 provides the optical energy of all four of light signals 112-1 through 112-4, combined as composite output signal 114-3, on output port 110 of waveguide 102-2.

In some embodiments, at least one of directional couplers 108-1 through 108-3 is an asymmetric directional coupler.

It should be noted that FIG. 1 depicts only one example of an arrangement of waveguides 102-1 through 102-4 and directional couplers 108-1 through 108-3 for mapping light signals 112-1 through 112-4 through mixing region 106. One skilled in the art will recognize, after reading this Specification, that light signals 112-1 through 112-4 can propagate through mixing region 106 via any of several suitable arrangements of waveguides 102 and directional couplers 108 such that the light signals are combined and provided at output port 110 located on any one of the waveguides.

It is an aspect of the present invention that beam combiner 100 can combine multiple light signals characterized by markedly different wavelengths with less cost and complexity than beam combiners known in the prior art. This is due, in part, to the tree structure of directional couplers in mixing region 106, which is determined by the design of the planar lightwave circuit. The arrangement of directional couplers does not depend upon the population of the input ports. As a result, the present invention facilitates combining groups of wavelengths in numbers that are difficult, if not impossible, with prior-art beam combiners. For example, misalignment of a light source with beam combiner 100 merely results in higher coupling loss for the light signal provided by that source. It would not, however, affect the coupling relationship of that light signal with other light signals. Nor would such misalignment perturb the optical coupling efficiency of any light sources already optically coupled with the beam combiner. In addition, the costs associated with populating beam combiner 100 with multiple light sources is substantially linearly dependent on the number of light sources. Finally, beam combiner 100 can be relatively low cost, as compared to prior-art beam combiners, since it is based on a planar lightwave circuit that is amenable to fabrication using conventional CMOS fabrication, which can be mass-manufactured in a cost-effective manner.

It is another aspect of the present invention that it enables embodiments that are capable of combining more than sixteen light signals, at different wavelengths, without significantly increasing system complexity and cost. The basic design of beam combiner 100 can be expanded to enable the combination of such a large number of light signals by simply adding branches and/or layers to the tree structure of directional couplers in mixing region 106. These aspects of the present invention are in contrast to beam combiners known in the prior art.

It is yet another aspect of the present invention that mixing region 106 comprises only waveguides and directional couplers that incorporate portions of the waveguides. As a result, embodiments of the present invention can have much lower thermal sensitivity than beam combiners in the prior art.

It is a further aspect of the present invention that embodiments based on high-contrast, undoped silicon nitride- and silicon oxide-based surface waveguides have several unique advantages over other technologies that have the potential for forming a beam combiner, such as lithium niobate waveguides, polymer waveguides, fusion spliced optical fibers, and the like. These advantages include:
i. an ability to taper regions of the waveguides to locally change the characteristics of the propagating mode of light travelling through the system; and
ii. higher optical power handling; and
iii. waveguides having different refractive index contrast, which enables high-contrast waveguide regions where tight mode confinement is desired and low-contrast waveguide regions where desired; and
iv. small-area optical circuits, which enables greater functionality in a smaller footprint; and
v. low transmission loss over a wide range of wavelengths, including for wavelengths as short as 400 nm; and
vi. individual optimization for a specific wavelength to be conveyed by a particular waveguide; and
vii. improved control over the polarization characteristics.

Figure 4:
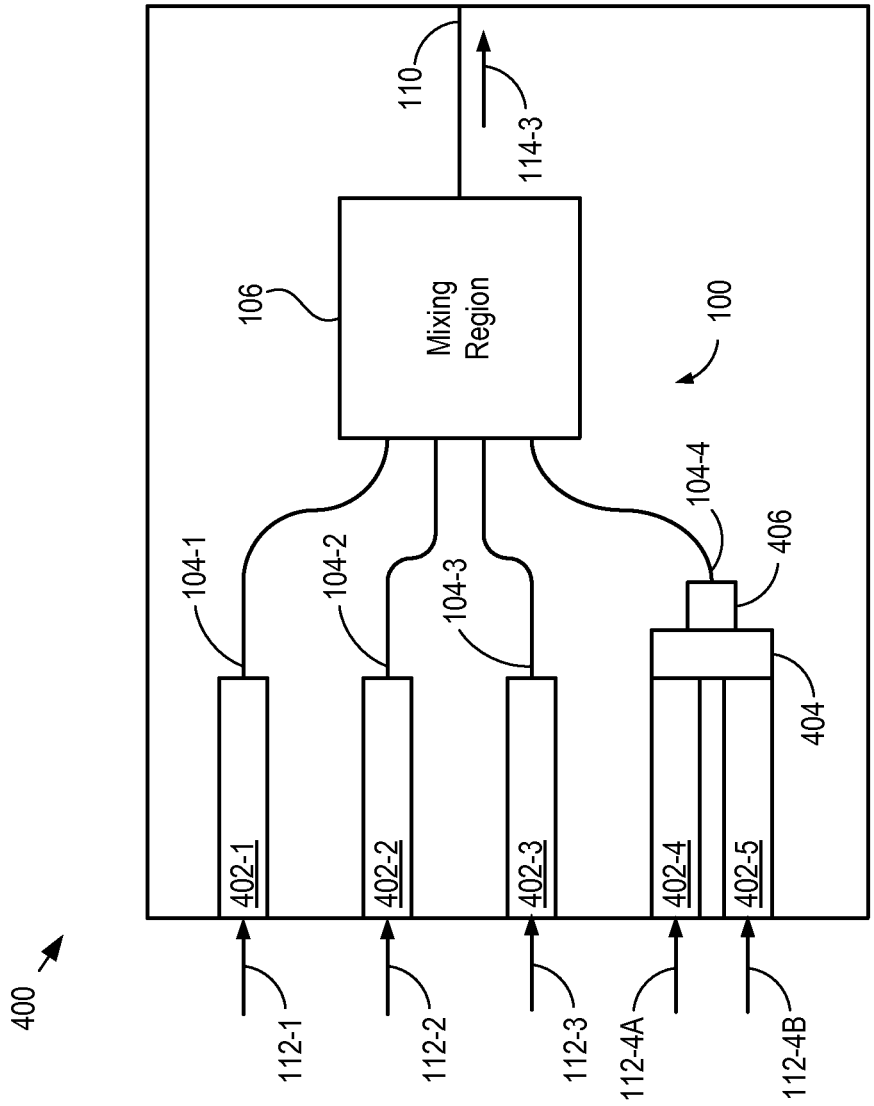
FIG. 4 depicts a schematic drawing of a beam combiner in accordance with a first alternative embodiment of the present invention.

FIG. 4 depicts a schematic drawing of a beam combiner in accordance with a first alternative embodiment of the present invention. Beam combiner 400 comprises beam combiner 100, mode-matching regions 402-1 through 402-5, attenuator 404, and power monitor 406.

Mode-matching regions 402-1 through 402-5 (referred to, collectively, as mode-matching regions 402) facilitate low-loss optical coupling between beam combiner 100 and the light sources that provide light signals 112 (i.e., fiber-pigtailed laser diodes). As a result, mode-matching regions 402 facilitate low-loss optical coupling with conventional optical fibers (which are typically used as such fiber pigtails).

One skilled in the art will recognize, after reading this Specification, that the output optical mode of the optical fiber of such a source is typically not well matched with the propagation mode in a high-contrast waveguide, such as waveguides 102 and that such a modal mismatch typically introduces high fiber-to-chip coupling loss. Each of mode-matching regions 402, however, has a cross-section that tapers smoothly from a smaller cross-section at its end facet to substantially the same cross-section as waveguides 102 at an interface where the mode-matching region meets its corresponding waveguide 102. This enables the mode-matching region to have a low effective refractive-index contrast that (1) substantially matches that of the light source fiber pigtail (thereby enabling low-loss fiber-to-waveguide optical coupling); and (2) transitions adiabatically (i.e., substantially without loss) to the high effective refractive-index contrast of waveguide 102.

FIG. 5A depicts a schematic drawing of a top view of a mode-matching region in accordance with the first alternative embodiment of the present invention. Mode-matching region 402-$i$ is representative of each of mode-matching regions 402.

Mode-matching region 402-$i$ is a region of waveguide 102-$i$ whose cross-sectional area is gently tapered such that it increases monotonically from end facet 504-$i$ to interface 506-$i$ along length L. Mode-matching region 402-$i$, therefore, gently transitions from (1) an effective index-contrast that yields a mode-field diameter at end facet 504-$i$ that substantially matches the mode-field diameter of the light source to (2) an effective index-contrast that yields a mode-field diameter at interface 506-$i$ that substantially matches the mode-field diameter of waveguide 102-$i$. As a result, the optical mode of light propagating through mode-matching region 402-$i$ is matched to the optical mode of the optical fiber pigtail of the light source that provides light signal 112-$i$ at end facet 504-$i$, while the optical mode of light propagating through mode-matching region 402-$i$ is matched to the optical mode of waveguide 102-$i$ at interface 506-$i$.

In some embodiments of the present invention, a light source that provides one of light signals 112 is characterized by a high effective index contrast that yields a small mode-field diameter. In such embodiments, therefore, mode-matching region 402-$i$ gently transitions from (1) a cross-section having a high effective index-contrast that yields a mode-field diameter that substantially matches the mode-field diameter of the light source at end facet 504-$i$ to (2) a cross-section having an effective index-contrast that yields a mode-field diameter that substantially matches the mode-field diameter of waveguide 102 at interface 506-$i$.

FIG. 5B depicts a schematic drawing of a cross-sectional view of the end facet of a mode-matching region in accordance with the first alternative embodiment of the present invention. End facet 504-$i$ is representative of each of end facets 504-1 through 504-4.

End facet 504-$i$ comprises lower cladding 202, inner core 510, outer core 512, and upper cladding 206.

Inner core 510 is analogous to inner core 208; however, inner core 510 has a substantially square cross-sectional shape having a size of w1, where w1 is smaller than the size of inner core 208 (1 micron in the illustrative embodiment). In order to mode-match a conventional optical fiber pigtail at typical wavelengths for light signals 112, w1 is typically within the range of a few hundred nanometers.

Outer core 512 is analogous to outer core 210; however, outer core 512 has a thickness of w2, where w2 is smaller than the thickness of outer core 210 (200 nm in the illustrative embodiment). In order to mode-match a conventional optical fiber pigtail at typical wavelengths for light signals 112, w2 is approximately equal to several tens of nanometers.

FIG. 5C depicts a schematic drawing of a cross-sectional view of the interface of a mode-matching region in accordance with the first alternative embodiment of the present invention. Interface 506-$i$ is representative of each of interfaces 506-1 through 506-4.

Interface 506-$i$ comprises lower cladding 202, inner core 208, outer core 210, and upper cladding 206. In other words, interface 506-$i$ has the same dimensions and layer structure as waveguide 102. As a result, light propagating through mode-matching region 506-$i$ experiences substantially lossless (i.e., adiabatic) transition into waveguide 102.

Mode-matching region 502-$i$ enables the simultaneous use of both high- and low-index contrast waveguides in beam combiner 400. High-index contrast enables tight waveguide curvatures needed in large-scale integration optical circuits, whereas low-index contrast is beneficial for good fiber-to-chip coupling and low-loss waveguide crossings.

In some embodiments, at least one of the light sources that provides a light signal 112 does not include an optical fiber pigtail. In such embodiments, the output facet of the light source is optically coupled directly with a mode-matching region that includes an end facet having suitable dimensions for matching the output mode of the light signal exiting the output facet of the light source.

Figure 6:
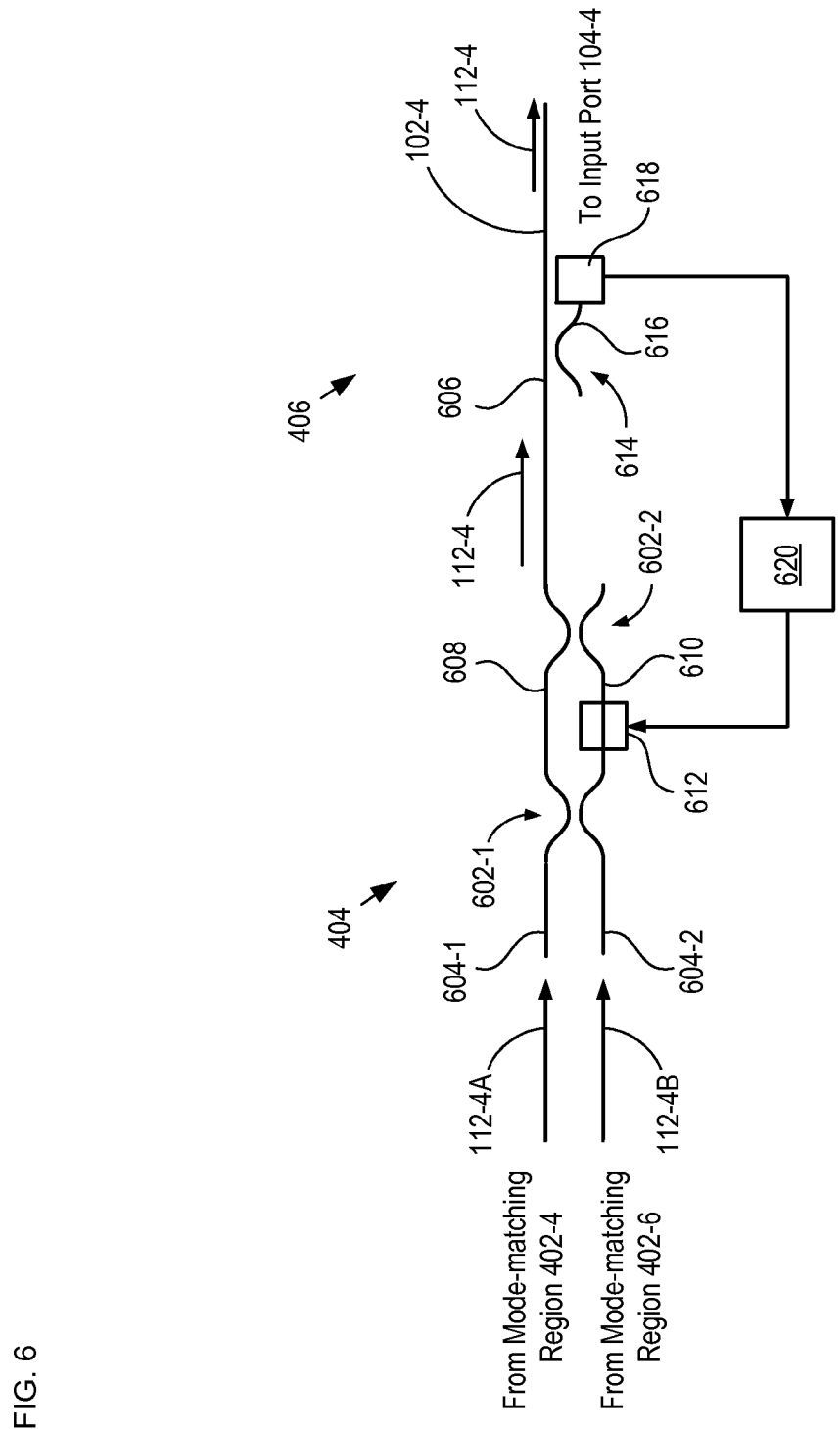
FIG. 6 depicts a schematic drawing of an attenuator/switch and optical monitor in accordance with the first alternative embodiment of the present invention.

FIG. 6 depicts a schematic drawing of an attenuator/switch and optical monitor in accordance with the first alternative embodiment of the present invention.

Attenuator 404 comprises directional couplers 602-1 and 602-2, input ports 604-1 and 604-2, output waveguide 606, waveguide portions 608 and 610, and modulator 612.

Directional couplers 602-1 and 602-2 are substantially identical directional couplers are arranged in a series arrangement and interposed and optically coupled by waveguide portions 608 and 610. Waveguide portion 608 is a portion of waveguide 102-4, as shown above and with respect to FIG. 4. Waveguide portion 610 is analogous to waveguide 102-4.

Input ports 604-1 and 604-2 receive light signals 112-4A and 112-4B from mode-matching regions 402-4 and 402-5, respectively. Light signals 112-4A and 112-4B are provided by substantially identical light sources; therefore, they are characterized by substantially the same wavelength.

Modulator 612 comprises a heater strip for inducing a phase shift in the light that propagates through waveguide 610 to induce a desired amount of constructive or destructive interference between the light signals in waveguides 608 and 610. By controlling the phase of the light in waveguide 610, therefore, light signal 112-4A, light signal 112-4B, or any combination of light signals 112-4A and 112-4B can be provided as light signal 112-4 on output waveguide 606. In other words, attenuator 404 can be made to behave as a variable optical attenuator and/or optical switch.

Although the illustrative embodiment comprises modulators that operate on a thermo-optic effect, it will be clear to one skilled in the art, after reading this Specification, how to specify, make, and use alternative embodiments of the present invention that comprise modulators that induce a phase shift in light propagating in a waveguide based on a different effect, such as electro-optic, opto-mechanical, etc.

Optical monitor 406 comprises directional coupler 614, output waveguide 606, waveguide portion 616, photodetector 618, and controller 620.

Directional coupler 614 receives light signal 112-4 on output waveguide 606 of attenuator 404 and enables a small percentage of its optical power to be coupled from output waveguide 606 into waveguide portion 616. Waveguide portion 616 is analogous to waveguide 102. Preferably, directional coupler is an asymmetric coupler; however, in some embodiments, directional coupler 614 is a symmetric coupler.

Waveguide portion 616 is optically coupled with photodetector 618, which is a conventional device for providing an electrical signal indicative of the intensity of light coupled into waveguide portion 616 (e.g., photodiode, avalanche photodiode, CCD sensor element, etc.). Photodetector 618 is electrically coupled with controller 620, which controls the output of the light sources that provide light signals 112-4A and 112-4B and modulator 612. When photodetector 618 detects that the intensity of light signal 112-4 has dropped below a user-determined threshold value, the controller drives modulator 612 to enable attenuator 404 to reconfigure light signals 112-4A and 112-4B on output waveguide 606. As a result, the downtime of a system that includes the beam combiner 100 can be reduced.

Figure 7:
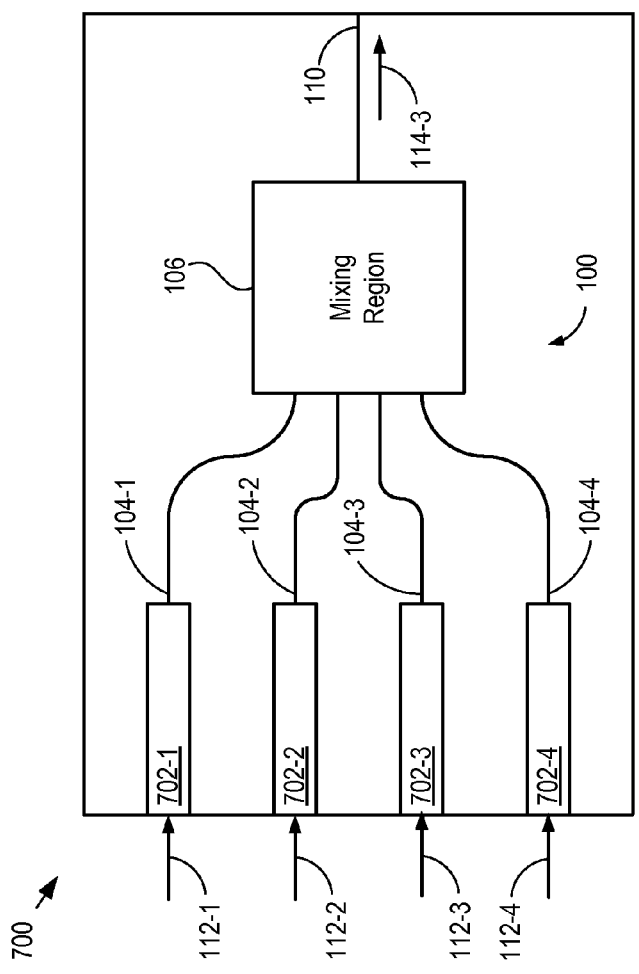
FIG. 7 depicts a schematic drawing of a beam combiner in accordance with a second alternative embodiment of the present invention.

FIG. 7 depicts a schematic drawing of a beam combiner in accordance with a second alternative embodiment of the present invention. Beam combiner 700 comprises beam combiner 100 and polarization filters 702-1 through 702-4. Polarization filters 702-1 through 702-4 (referred to, collectively, as filters 702) provide suppression of the TE polarization mode of light signals 112, wherein this suppression augments the TE mode suppression provided inherently by the directional couplers in mixing region 106.

Figure 8:
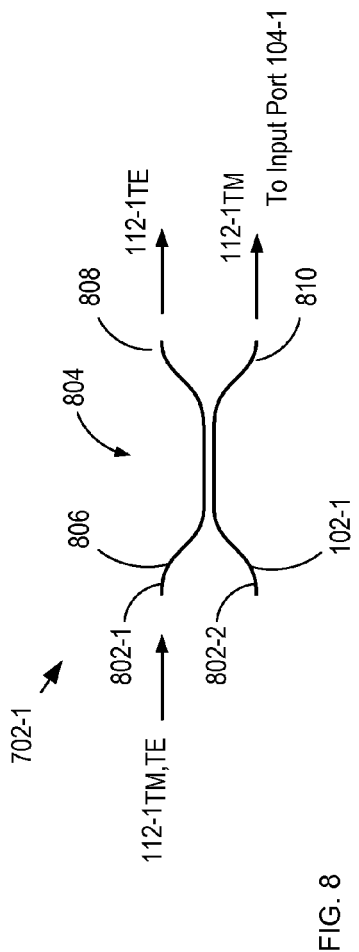
FIG. 8 depicts a schematic drawing of a polarization filter in accordance with the second alternative embodiment of the present invention.

FIG. 8 depicts a schematic drawing of a polarization filter in accordance with the second alternative embodiment of the present invention. Filter 702-1 comprises inputs 802-1 and 802-2, directional coupler 804, and outputs 808 and 810. Filter 702-1 is representative of each of filters 702.

Light signal 112-1 (denoted as 112-1$_{TM,TE}$ to indicate the presence of both the TE and TM polarization modes in the light signal) is received by filter 702-1 at input 802-1.

Directional coupler 804, which comprises waveguide 102-1 and waveguide portion 806, is analogous to directional couplers 108, described above and with respect to FIG. 1. Directional coupler 804 preferentially couples the TM polarization mode from waveguide portion 806 into waveguide 102-1. One skilled in the art will recognize, after reading this Specification, that the coupling strength of directional coupler 804 for the TM polarization mode is significantly greater than the coupling strength for the TE polarization mode.

As a result, nearly all, or substantially all, of light signal 112-1$_{TE}$ propagates through directional coupler 804 on waveguide portion 806 while nearly all, or substantially all, of light signal 112-1$_{TM}$ is coupled into waveguide 102-1 and is provided to output port 810. A typical TM/TE extinction ratio for directional coupler 804 is approximately 10 dB, for example. It should be noted that additional suppression of the TE mode of light signal 112-1 (as well as each of light signals 112-2 through 112-4) occurs at each directional coupler included in mixing region 106. As a result, beam combiner 600 substantially strips the TE mode of each of light signals 112 while combining the TM mode of the signals into composite output signal 114-3.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A beam combiner that includes:
   a planar lightwave circuit comprising;
      a plurality of input ports;
      a mixing region, the mixing region comprising a plurality of directional couplers that are arranged in a first arrangement comprising a tree structure; and
      a first output port that is optically coupled with the plurality of input ports via the mixing region; and
   a first polarization filter that is optically coupled with a first input port of the plurality of input ports, the first polarization filter receiving a first light signal comprising a first polarization mode having a first magnitude and a second polarization mode having a second magnitude, wherein the first polarization filter provides the first light signal to the first input port such that the first polarization mode has a third magnitude that is substantially equal to the first magnitude and the second polarization mode has a fourth magnitude that is less than the second magnitude.

2. The beam combiner of claim 1 wherein the first input port comprises a first waveguide portion and a second waveguide portion, the first waveguide portion being characterized by a refractive-index contrast that is lower than the refractive-index contrast of the second waveguide portion.

3. The beam combiner of claim 2 wherein the first input port comprises a first surface waveguide that includes a first tapered region having a first length, wherein the cross-sectional area of the first surface waveguide changes monotonically along the first length.

4. The beam combiner of claim 1 wherein the planar lightwave circuit comprises a first surface waveguide having an inner core comprising silicon dioxide, an outer core comprising silicon nitride, and an upper cladding comprising silicon dioxide.

5. The beam combiner of claim 1 wherein the planar lightwave circuit comprises a first surface waveguide having a core comprising silicon nitride.

6. The beam combiner of claim 1 wherein the planar lightwave circuit comprises a first surface waveguide comprising:
   a first layer comprising silicon nitride; and
   a second layer comprising silicon dioxide, the second layer disposed on and in contact with the first layer, and the second layer being a TEOS-based layer.

7. The beam combiner of claim 1 wherein the planar lightwave circuit comprises an attenuator comprising a first directional coupler, a second directional coupler, and a phase adjuster, wherein the first directional coupler and the second directional coupler are optically coupled in a series arrangement, and wherein the phase adjuster controls attenuation of light propagating through the attenuator based on a first control signal.

8. The beam combiner of claim 1 wherein a second input port of the plurality thereof is operative for receiving a light signal from a source, and wherein the second input port includes a mode-matching region that comprises:
   a first end facet having a first mode-field diameter that substantially matches the mode-field diameter of the source; and
   a first interface having a second mode-field diameter that substantially matches the mode-field diameter of a waveguide of the planar lightwave circuit, wherein the first mode-field diameter and second mode-field diameter are different.

9. The beam combiner of claim 8 wherein the source of the first light signal is a laser diode.

10. The beam combiner of claim 1 wherein the first input port is substantially wavelength tunable over a wavelength range.

11. The beam combiner of claim 1 wherein the planar lightwave circuit comprises a first waveguide portion and a second waveguide portion, the first waveguide portion and second waveguide portion being optically coupled, wherein the first waveguide portion is characterized by a first refractive-index contrast, and wherein the second waveguide portion is characterized by a second refractive-index contrast that is higher than the first refractive-index contrast.

12. The beam combiner of claim 1 wherein the plurality of input ports comprises a first directional coupler that is dimensioned and arranged to (1) enable each of a first light signal and a second light signal in a first waveguide to substantially completely couple from the first waveguide into a second waveguide and (2) substantially disable optical coupling of each of a third light signal and a fourth light signal in the second waveguide from the second waveguide into the first waveguide.

13. The beam combiner of claim 8 wherein the source of the first light signal is an optical fiber.

* * * * *